United States Patent [19]

Schmidt et al.

[11] Patent Number: 5,258,830
[45] Date of Patent: Nov. 2, 1993

[54] AUTOMATIC VIDEO CONVERGENCE SYSTEM

[75] Inventors: Terrence C. Schmidt, Wellesley; Alen Koebel, Kitchener, both of Canada

[73] Assignee: Electrohome Limited, Canada

[21] Appl. No.: 963,286

[22] Filed: Oct. 19, 1992

Related U.S. Application Data

[63] Continuation of Ser. No. 578,238, Sep. 6, 1990, abandoned.

[30] Foreign Application Priority Data

Mar. 16, 1990 [CA] Canada ................ 2012377

[51] Int. Cl.⁵ .............................................. H04N 9/28
[52] U.S. Cl. ......................................... 358/60; 358/10
[58] Field of Search ................................. 358/60–69, 358/139, 10, 212, 213.11, 199, 204, 52; 315/368

[56] References Cited

U.S. PATENT DOCUMENTS

| | | | |
|---|---|---|---|
| 3,962,722 | 6/1976 | Ciciora | 358/10 |
| 4,305,022 | 12/1981 | Mitamura et al. | 315/370 |
| 4,305,092 | 12/1981 | Katzfey | 358/60 |
| 4,400,719 | 8/1983 | Powers | 358/21 R |
| 4,422,019 | 12/1983 | Meyer | 315/368 |
| 4,441,120 | 4/1984 | Gerritsen | 358/10 |
| 4,456,923 | 6/1984 | Annegarn et al. | 358/64 |
| 4,482,919 | 11/1984 | Alston et al. | 358/152 |
| 4,524,379 | 6/1985 | Okada et al. | 358/11 |
| 4,549,117 | 10/1985 | Takahashi et al. | 315/371 |
| 4,593,309 | 6/1986 | Uno et al. | 358/10 |
| 4,602,272 | 7/1986 | Duschl | 358/10 |
| 4,630,121 | 12/1986 | Suzuki et al. | 358/227 |
| 4,633,294 | 12/1986 | Nadan | 358/11 |
| 4,642,529 | 2/1987 | Penn | 315/368 |
| 4,659,930 | 4/1987 | Johnson et al. | 250/336.1 |
| 4,672,275 | 6/1987 | Ando | 315/368 |
| 4,683,467 | 7/1987 | Macaulay et al. | 340/705 |
| 4,686,429 | 8/1987 | Fendley | 315/368 |
| 4,757,239 | 7/1988 | Starkey, IV | 315/371 |
| 4,800,278 | 1/1989 | Taniguti et al. | 250/338.1 |
| 4,857,998 | 8/1989 | Tsujihara et al. | 358/60 |
| 4,879,470 | 11/1989 | Sugawa et al. | 250/578 |
| 4,897,721 | 1/1990 | Young et al. | 358/139 |
| 4,937,675 | 6/1990 | Starceski et al. | 358/229 |

FOREIGN PATENT DOCUMENTS 291924 11/1988 European Pat. Off. .

Primary Examiner—James J. Groody
Assistant Examiner—Safet Metjahic
Attorney, Agent, or Firm—Banner, Birch, McKie & Beckett

[57] ABSTRACT

An automatic convergence system for correcting misregistration of component color images in a projection video display unit. The system comprises control circuitry for generating target characters onto a projection surface, and a locator assembly for aiming a photosensor array at the displayed target images by means of a pair of stepper motors. The photosensor array detects the position of the target images and conveys this information to a microprocessor which in response calculates appropriate correction signals for application to vertical and horizontal convergence coils of the display system for effecting convergence of the component color images.

13 Claims, 4 Drawing Sheets

AUTOMATIC VIDEO CONVERGENCE SYSTEM

This application is a continuation of application Ser. No. 07/578,238, filed Sep. 6, 1990 now abandoned.

TECHNICAL FIELD

The present invention relates in general to video systems, and more particularly to a digital convergence correction circuit for convergence correction of projected electron beams in projection video display systems.

BACKGROUND OF THE INVENTION

Well known colour video projection systems are comprised of three colour electron guns (red, green and blue) for emitting three separate electron beams which are transmitted through respective CRT face plates having respective red, green and blue phosphor layers. The coloured beams emitted from the posphor on the faceplate of each CRT are then focused together on a projection surface with varying intensities, for creating a composite colour image. Each of the electron beams is magnetically deflected via respective main deflection coils for directing the beams from left to right across the projection surface along a plurality of horizontal scan lines. The number of scan lines appearing on the projection surface for each image (raster) may vary in relation to the scanning frequency of the projection system.

Due to various magnetic influences and non-linearities in the projection system, each of the electron beams may bend more or less in relation to one another at the left and right and top and bottom extremities of the image on the projection surface.

Furthermore, since the respective coloured light beams are projected at different angles for focusing at the centre point, misregistration of the images is known to occur on the edges of the screen, etc.

In order to correct the problem of misregistration of images in projection video systems, convergence systems have been developed for deflecting respective ones of the beams by predetermined amounts in accordance with information input to the convergence system by an operator using a cursor control, etc.

It is known to use vertical and horizontal convergence coils for re-orienting the electron beams at predetermined locations within the image in order to effect proper registration of the three colours.

More recently, automatic convergence systems have been developed which utilize sensors for detecting misregistration of a projected image at various zones on the screen and automatically deflecting the electron beams by the required amounts for obtaining convergence of the image without user input. The sensors in known automatic convergence systems have typically been fabricated using CCD arrays. The CCD arrays detect and digitize the projected image, which is then processed via microprocessor circuitry for detecting misregistration. In response to detecting misregistration, the microprocessor circuitry generates appropriate convergence coil signals, etc. A disadvantage of CCD based sensors is that such sensors integrate the image over an entire raster frame. Accordingly, the signal-to-noise ratio of the detected image relative to detected ambient light is very low. As a result, CCD image sensors are characterized by poor image detection, especially in relation to blue phosphor.

SUMMARY OF THE INVENTION

According to an aspect of the present invention, an automatic convergence system is provided for generating a target image on the display surface at a point to be converged, aiming a photosensor array at the target using direct drive microstepping motors, sensing misregistration between colour components of the target image by means of the photosensor array, and moving the colour components at the convergence point in order to register the component colour images.

Direct drive microstepping motors provide highly accurate (approximately 0.05° per microstep) means for locating the target image. Registration of the component colour images thereafter may be effected by offset measurement from the located position of the initial target image. The microstepping motors are low friction devices which are capable of moving from a first to a second position and returning to the first position with a high degree of accuracy in repositioning.

The photosensor of the present invention overcomes the disadvantages discussed above with reference to CCD sensors. In particular, because a photodiode array has a fast response as opposed to the relatively slow response from time averaging CCD sensors, the high peak intensities from a CRT phosphor can be readily sensed from low reflectivity surface such as rear screen and off-axis high-gain (i..e. curved) front screens.

According to an additional aspect of the present invention, compensation diodes are connected with reverse polarity to respective ones of the quadrant photodiodes in the sensor. The compensation photodiodes are located outside of the illumination area of the quadrant photodiodes such that the illuminated image falls only on the inner photodiodes whereas ambient light illuminates both the quadrant and compensation photodiodes. Accordingly, both the compensation and quadrant photodiodes generate equal but reverse photogenerated currents in response to the ambient light. The photogenerated currents due to ambient light cancel, leaving only the current due to illumination of the inner photodiodes by the image.

An additional advantage of the present invention is that the dark current generated by the compensation diodes is equal and in opposite direction to the dark current generated by the respective inner quadrant photodiodes, since both photodiodes are electrically matched and operate at the same temperature.

Thus, according to a general aspect of the present invention, there is provided in a video display, an automatic convergence system for correcting misregistration of component colour images projected onto a surface, comprising:
a) means for generating a first component colour target image at a predetermined convergence point on said surface; said
b) means for locating the position of target image on said surface relative to a predetermined reference frame;
c) means for generating further component colour images at said convergence point;
d) means for locating respective positions of said further images relative to said reference frame, and;
e) means for successively calculating the differences between the positions of said first component colour target image and said respective positions of said further images and in response moving said further component colour images respective amounts proportional to said differences until said differences are substantially eliminated, such that said target image and said further images are in substantial registration.

BRIEF DESCRIPTION OF THE DRAWINGS

A preferred embodiment of the present invention will be described in greater detail below with reference to the following drawings, in which.

DETAILED DESCRIPTION OF THE INVENTION

Figure 1:
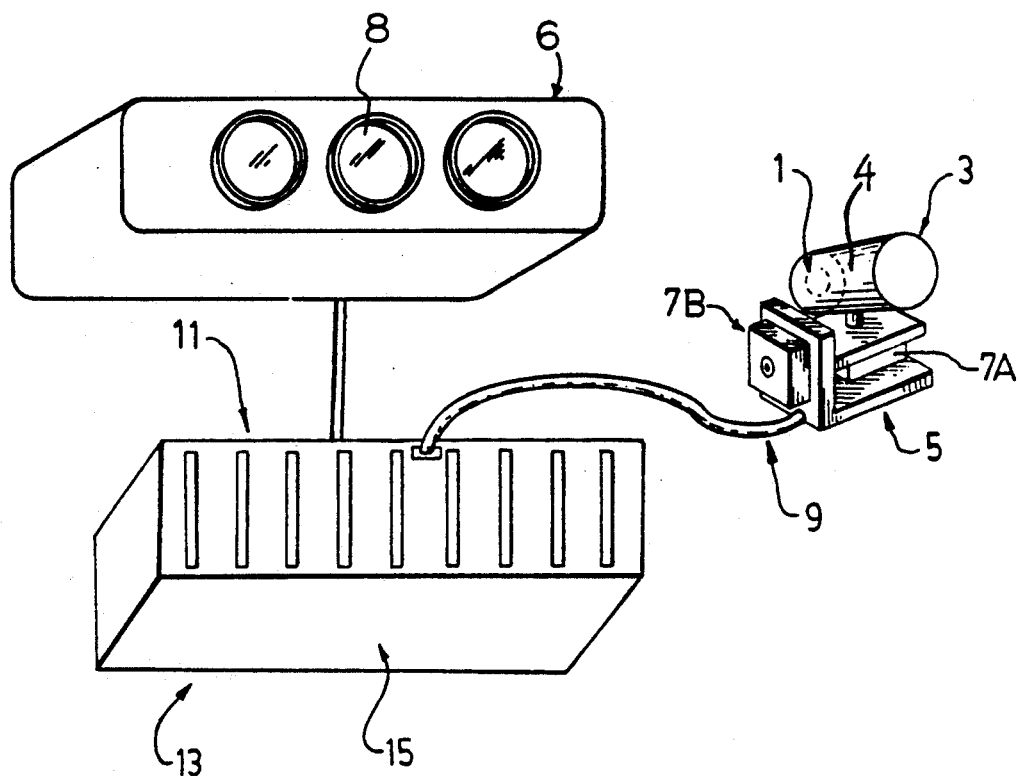
FIG. 1 is a schematic illustration of an automatic convergence system employing a quad photodiode sensor in accordance with the present invention.

Turning to FIG. 1, an automatic convergence system is shown according to the preferred embodiment comprising a quadrant photodiode sensor 1 in association with imaging lens 3 and mounted on an X/Y motor assembly 5. The sensor/motor assembly 5 consists of a mechanical structure supporting two stepper motors 7 in an X/Y gimbal configuration for orienting the imaging lens 3 and sensor 1 to focus on a projected image (not shown), and a tubular housing 4 containing the lens 3 at one end and the sensor 1 at the other end. The sensor is attached to a small surface mount preamplifier board, as discussed below with reference to FIG. 3.

Preferably, the sensor/motor assembly 5 is attached to the frame of a projector 6 directly beneath the center (green) lens 8 thereof.

A wire harness 9 connects the quadrant photodiode sensor 1 and motors 7 to a motherboard 11 within a card cage 13 supporting a main printed circuit board 15 which contains the circuitry for operating the motors 7 and digitizing the signals received from the quadrant photodiode sensor 1, as discussed in greater detail below with reference to FIG. 3.

The positions of the red, green and blue image components at the projected image point are detected by the sensor 1 and adjusted to coincide with the center of the quadrant. Full screen convergence is effected by repeating the operation for a multiplicity of convergence points of the entire raster image, as discussed in greater detail below with reference to FIG. 4.

The automatic convergence operation is initiated by making a selection from a convergence menu (FIG. 5) via the projector's remote or built-in key-pads (not shown). Thereafter, software running in the convergence system microprocessor 39 assumes control of the projector until completion of the convergence or until aborted by a user. During the convergence operation, the microprocessor 39 uses the video control board (not shown, but incorporated in card cage 13) to display targets and patterns required by the convergence algorithms.

Figure 2:
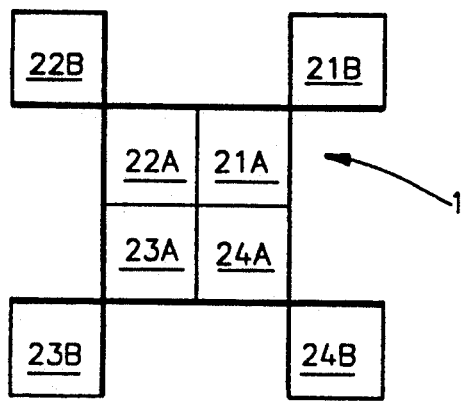
FIG. 2 is a plan view of the quad photodiode sensor in accordance with the preferred embodiment.

Sensor 1 is shown in greater detail with reference to FIG. 2, comprising a quadrant arrangement of four inner photodiodes 21A, 22A, 23A and 24A, and four corresponding and matched reverse biased outer compensation photodiodes 21B, 22B, 23B and 24B. As discussed above, the function of reverse bias compensation diodes 21B-24B is to cancel the effect of ambient light illumination and sensor dark current in the sensor 1. In particular, by direct connection of the compensation diodes 21B-24B in a reverse direction of polarity to respective ones of the quad photodiodes 21A-24A, photogenerated current due to ambient room light is effectively cancelled, as well as temperature generated sensor dark current, resulting in a significant boost in signal to noise ratio of the illuminated image, as well as preventing switching noise of the detected image signal prior to amplification via the preamplifier circuitry discussed below with reference to FIG. 3.

Since the photodiode sensor is peak responding, unlike prior art CCD sensors that integrate over an entire frame, the high peak intensities from a CRT phosphor can be readily sensed by the quad photodiode sensor 1 from low reflectivity surfaces such as rear screens and off-axis high-gain front screens.

The inner photodiodes 21A-24A and outer compensation diodes 21B-24B must be substantially matched such that, under uniform illumination, the compensation diode reverse photocurrent is equal to the inner quadrant diode photocurrent within $+/-1$ percent.

According to a successful prototype, the area of each quadrant and compensation photodiode was $1.2 \times 1.2$ mm, with a metalization separation of 0.2 mm. The compensation photodiodes 21B-24B were placed as close as practical to corresponding respective ones of the inner quadrant photodiodes 21A-24A so as not to exceed a separation of 0.25 mm.

Figure 3:
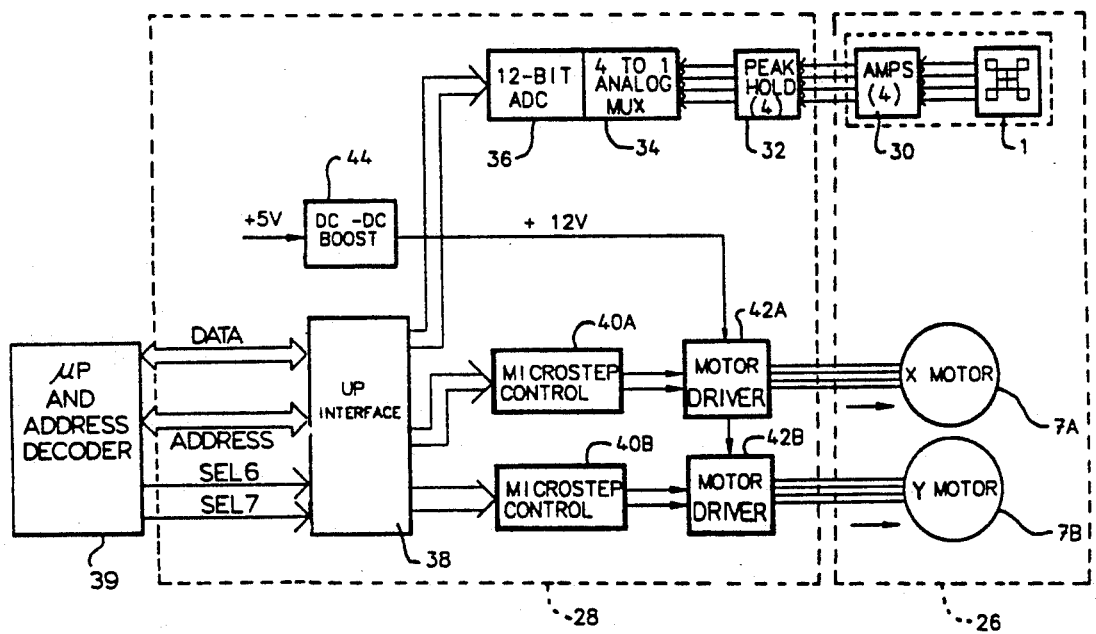
FIG. 3 is a block diagram of the control circuit and locator assembly in accordance with the preferred embodiment.

Turning to FIG. 3, the automatic convergence system of the present invention is shown in block diagrammatic form as two functional parts: the locator assembly 26 and the control circuit 28, mounted on main circuit board 15 within cardcage 13 (FIG. 1). Software for operating the circuitry illustrated in FIG. 3 resides in a PROM (not shown) on the projector's remote control board within card cage 13 and running on the microprocessor 39.

The microprocessor 39 and other circuitry associated with the projectors remote control board, would be well known to a person skilled in the art.

The locator assembly 26 is primarily an optomechanical device whose function is to aim the photosensor array 1 and its imaging lens 3 at a point on a projection screen utilizing a pair of X and Y stepper motors 7A and 7B. As discussed, the assembly 26 is preferably attached to the front of the projector directly below the green lens, or in the case of a retrobox installation, directly above the green lens.

As discussed above with reference to FIG. 1, the control circuit 28 is resident on a circuit board 15 located in a slot within the card cage 13 of the projector. The control circuit 28 contains all of the circuitry necessary to allow interfacing of the system microprocessor 39 to the photosensor 1 and the X and Y motors 7A and 7B.

The photosensor 1 generates four analogue voltages proportional to the amount of light on each of the inner quadrant photodiodes 21A-24A. These signals are amplified via respective preamplifiers 30 and transmitted therefrom to respective analogue peak-hold circuits 32 which hold the highest voltage levels received until selectively discharged. The resultant "peak" signals output from circuits 32 are applied to a four-to-one analogue multiplexer 34 which selects one of the four channels for input to a 12-bit analogue to digital converter 36. Channel selection and initiation of data conversion are performed under control of the system microprocessor 39 resident on the remote control board and accessible by data and address buses, and address decoded select lines through a microprocessor interface circuit 38.

The two stepper motors 7A and 7B in locator assembly 26 are controlled by identical circuits each consisting of a microstep controller 40A, 40B and a motor driver 42A and 42B. The microstep controller 40A, 40B receives digital data from the microprocessor 39 and in response specifies the levels of currents to be applied to each of the two windings of the corresponding motor 7A, 7B, as determined by internal digital-to-analogue converters (not shown) that are loaded by the system microprocessor 39. The motor drivers 42A and 42B provide the specified current at 12 volts DC to both phases of the respective motors 7A and 7B.

The DC-DC booster 44 is provided for converting logic level +5 volt supply to the projector level +12 volt supply required for operating the X and Y motors 7A and 7B.

As discussed above, the hardware illustrated with reference to FIGS. 1-3, is operated under control of software resident on the remote control board (not shown) of the projector system. The software performs an automatic convergence by the repetition of four fundamental operations. Firstly, a "target" image is generated at the location in the projected image that is to be converged. Secondly, the photosensor 1 is aimed at the target image using the stepper motors 7A and 7B. Next, any misregistration between the colour components of the target image is sensed by analyzing the signal outputs of the photosensor 1. Finally, the colour components at the convergence point are moved using the projector's resident convergence circuitry to register the colours.

The projector convergence circuitry is not shown herein but is well known existing technology and would be readily understood by a person skilled in the art.

Figure 4:
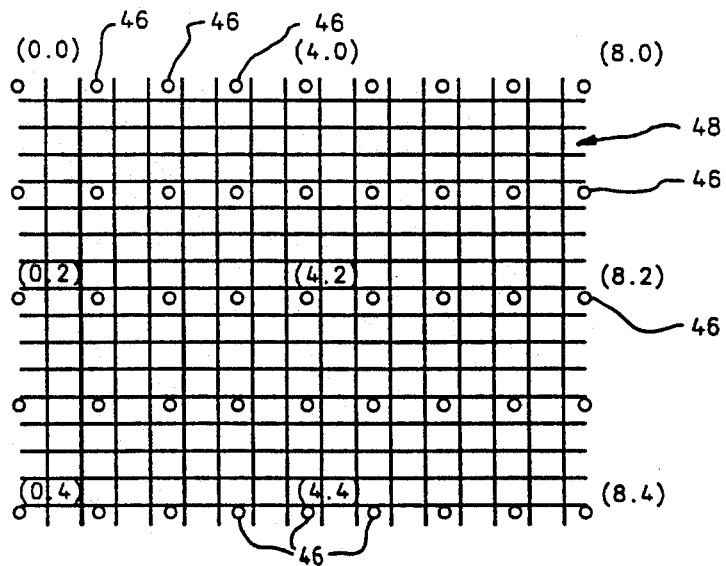
FIG. 4 is a diagrammatic representation of convergence control points on a projected raster, in accordance with the present invention.

As shown in FIG. 4, according to the preferred embodiment, 45 convergable points denoted by reference numeral 46 are provided on the projected raster arranged in a nine-by-five rectangular matrix (i.e. 9 horizontal points by 5 vertical points). These points are shown in FIG. 4 in relation to a cross hatch internal video pattern 48. The positions of the red, green and blue component images are independently specified at each of the convergence points 46. Positions at all parts of an image between convergence points are calculated by linear interpolation: horizontally by software and vertically by a digital convergence circuit in real time. The digital interpolation circuitry referred to herein does not form part of the present invention, but is completely disclosed in applicant's corresponding pending Canadian Patent Application Serial No. 592,422 filed on Mar. 1, 1989.

According to the preferred embodiment, the green image is chosen as the reference into which the red and blue images must be registered. The quadrant photosensor 1 can determine, individually, the positions of all three colour images of a target at any convergence control point 46 on the screen. Any position error, or "misconvergence" between the green target image and the red (or blue) target image at a control point can be eliminated by moving the red (or blue) image to the same position as the green image using the projector's internal convergence coil correction circuitry. For off-centre points, the digital convergence board provides the necessary correction by interpolation, as indicated above. For the centre of the screen, the remote control board generates control voltages that specify the positions of each colour raster as a whole. Convergence of the colours must be ensured at the centre of the screen before converging any other areas.

The position of the green reference targets on the screen at various convergence points 46 is measured in the coordinate system illustrated with reference to FIG. 4 by means of the two stepper motors 7A and 7B in the locator assembly 26. The motors 7A and 7B, supported orthogonally and constrained mechanically to sweep out finite angles, define part of a spherical coordinate system extending in a rectangular cone outward in space in front of the projector. A screen intersecting this cone can be considered to have a cross section of the coordinate system projected on its face, of which the horizontal axis is referred to as X and the vertical axis as Y. The origin is chosen to be a point in the lower left hand corner of the screen (as viewed from the projector). Position is defined in accordance with the present invention in terms of microsteps, which are subdivisions of the step angle of each motor 7A and 7B.

Relative position sensing of the colour targets (i.e. red-to-green and blue-to-green) is accomplished using the photosensor 1. In particular, the objective lens 3 (FIG. 1) focuses the image of a target at which the motors 7A and 7B have pointed it onto the central four quadrants 21A-24A of the photosensor 1. The position of the centroid of the target image on the photosensor is calculated as a function of the sums and differences of the four photodiode signals, as discussed in greater detail below. The resulting centroid coordinates are referenced from the centre of the four quadrants and are expressed as fractions of the target image's extent on the photosensor 1 in the horizontal and vertical axis.

In accordance with the preferred embodiment, the targets are preferably small solid rectangles produced by the projector's character-based internal video generator (not shown) within card cage 13. The generator can display characters within a 32-by-32 matrix. The rectangular target is formed from a single character and thus measures 1/32 of the screen in width and 1/32 of the screen in height. The character must be placed on the screen as close to a convergence control point 46 as the character matrix will allow in order to accurately represent the true position of the point in the three component colours.

Upon power-up of the system, an initial selection menu 50 is accessed by depressing a "CONVERGE" button 49 on a remote or built-in keypad (not shown) of the projector system. The menu item "ACON CONVERGENCE" is illustrated as item 5 on the selection menu 50, in addition to various manual convergence mode choice selections. By selecting the "ACON CONVERGENCE" entry, the projector displays a new selection menu entitled "ACON CONVERGENCE" denoted by reference numeral 52 in FIG. 5, allowing a choice between "full screen", "touch up" and "centre only (static)" options.

Once the "ACON CONVERGENCE" menu selection is made convergence of the image is completely automatic and terminates with an RGB cross hatch display 54 (FIG. 6) allowing the user to examine the results of the convergence. A menu is superimposed on the cross hatch display 54 that allows a choice between saving or not saving the new convergence in non-volatile memory. After either selection in the "save" menu of FIG. 6, the projector is returned to normal operation.

Although no user input is necessary during automatic convergence, the operation may be aborted at any time by pressing an "EXIT" key (not shown) of the remote or built-in key pad for at least one second. This results in termination of the convergence process and returning of the projector to normal operation. The projector may also be powered off in the middle of an automatic convergence, should the need arise, by depressing a "POWER" button (not shown).

Access to the ACON CONVERGENCE menu 52 is conditional on the presence of the control circuit 28 in the projector card cage 13. Without the circuit in place, the "ACON CONVERGENCE" menu 52 does not appear on the convergence menu 50 and cannot be selected.

In the event of a serious error occurring during an auto convergence or auto-centering operation, the system of the present invention provides for an automatic abort followed by the display of an error message. By depressing the "EXIT" key at this time, the projector is returned to normal operation. However, in the event the "EXIT" key is not depressed within 30 seconds from error display, the error is saved in non-volatile memory, the error message is erased from the screen and the projector is returned to normal operation. In this eventuality, the error message will then be displayed in the ACON CONVERGENCE menu 52 the next time it is accessed by the user.

Figure 7:
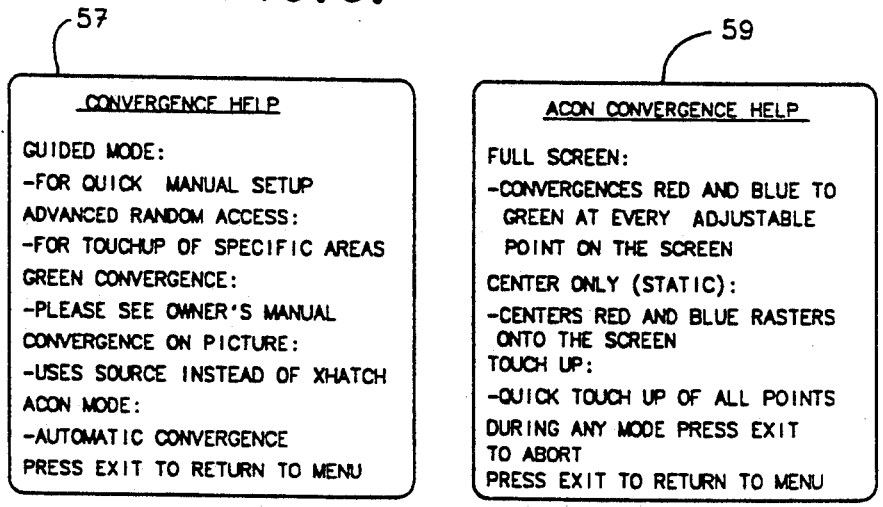
FIG. 7 illustrates a pair of help screens displayed in accordance with the preferred embodiment.

On-line descriptions of the various convergence modes may be accessed by depressing a "help" key (not shown) of the remote or built-in key pad while in either of the "CONVERGENCE" menu 50 or "ACON CONVERGENCE" menu 52, resulting in the projector displaying a corresponding one of the menus 57 or 59, as depicted in FIG. 7.

The software for implementing the present invention may be called from remote software module (i.e. REMOTE CSCI 60) by means of depressing the "CONVERGE" key 49. The software is composed of a hierarchy of modules with a kernel at the top, as shown with reference to FIG. 8. Several levels of functionality separate subroutine modules in the middle and a set of "hardware drivers" are provided at the bottom of the flow chart. The actual module names and functions are listed below in Table A.

TABLE A

| | |
|---|---|
| A_KERNEL: | The ACON Kernel takes control of projector functions after the user presses the 'CONVERGE' button on the projector's built-in or remote keypad. It is responsible for the display of the Convergence and ACON menus, keypad input, ACON database management and the initiation of autocentering and autoconvergence (by calling A_CENTER and A_CONV). |
| A_CENTER: | This module's function is to register the blue and red rasters onto the green raster at the screen center (autocentering). |
| A_CONV: | This module performs a full screen convergence by registering the red and blue colours to the green at each and every control point on the screen. (A full screen convergence actually requires that both A_CENTER and A_CONV be called sequentially) |
| SEARCH: | The function of SEARCH is to locate with the photosensor (by moving the motors), a (green) reference target displayed at a specified convergence control point. Once it is located the routine microsteps the motors to bring the target's centroid to the center of the sensor. |
| CONVERGE: | This routine registers the blue or red image to the green image at a selected convergence control point. The actual manipulation of horizontal and vertical convergence positions is done through the Convergence software package by passing parameters to it specifying the desired on-screen movements. |
| POS_CALC: | This routine calculates the position of the centroid of a visible target's image on the photosensor given all four quadrant readings. |
| MOTORMOV: | This hardware driver controls the X and Y stepper motors to point the photosensor at a specified coordinate on the projection screen. |
| DISPLAY: | This hardware driver draws a target on the screen in red, green or blue at a specified character position using the projector's internal video generator. |
| ACQUIRE: | This hardware driver reads the signals from all four quadrants of the photodiode array for a specified number of frames of video and returns the averaged values. |

Figure 8:
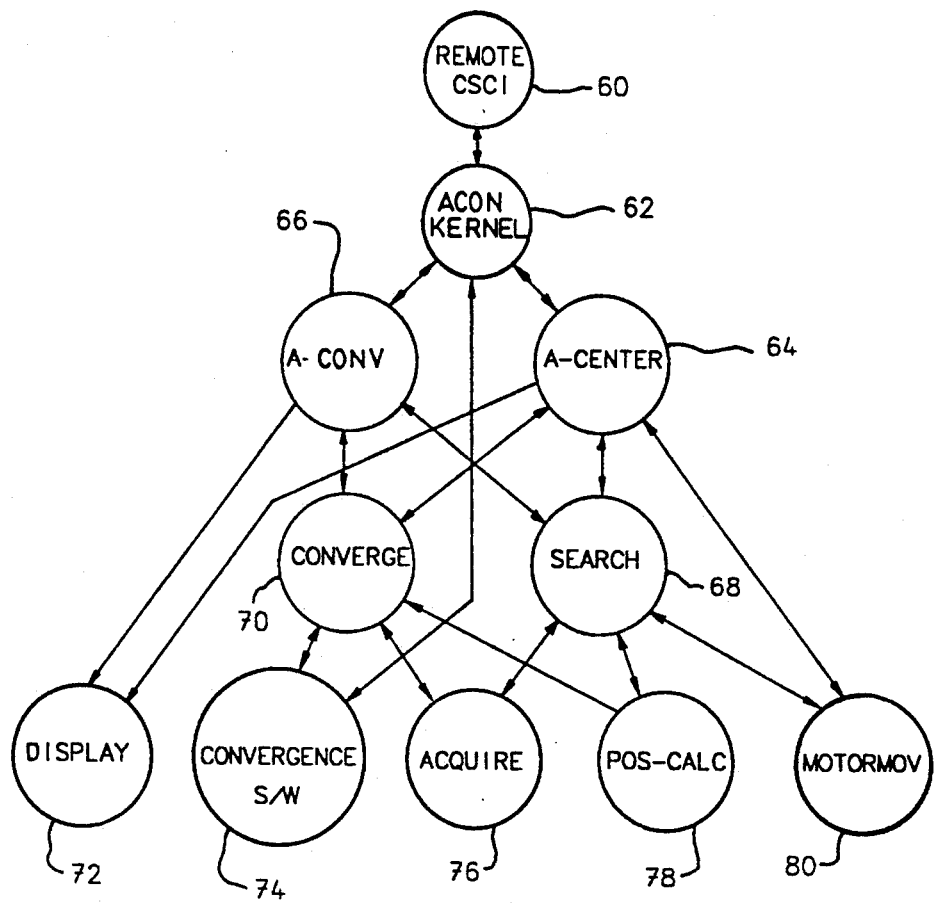
FIG. 8 is a software control flow diagram in accordance with the preferred embodiment.

With reference to FIG. 8, the ACON kernel module 62 provides the required user interface and database management of lower level modules for implementing the present invention.

Figure 5:
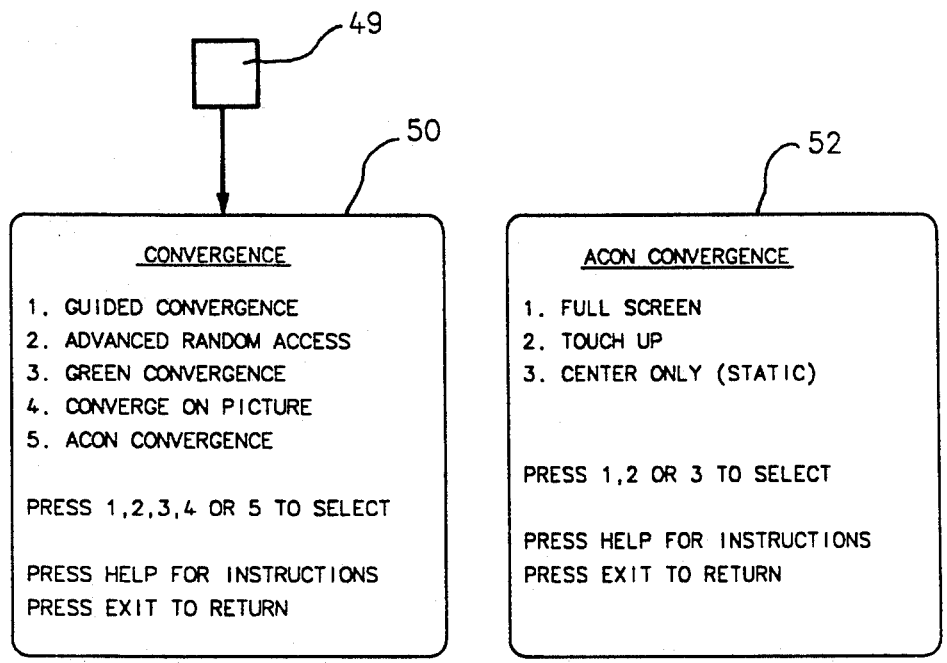
FIG. 5 illustrates a pair of selection menus displayed in accordance with the preferred embodiment.

A_KERNEL is initiated when the user presses the "CONVERGE" button 49 on the projector's built-in or remote keypad. The Remote software module 60, sensing and identifying the keypress, passes control to the ACON kernel 62. The Kernel causes displaying of the CONVERGENCE menu 50 listing the available modes of convergence (FIG. 5). It then checks for the presence of the ACON Control Board 28 in the projector. If the board is there, then "ACON Convergence" is added as the last menu item. The program then waits for an item selection keypress from the projector's keypad(s). If a manual convergence mode is selected by the user, the Kernel 62 passes control and the appropriate opcocode to the Convergence software module 70. Control is passed back to the Kernel after the user terminates the manual convergence mode. The kernel in turn passes control back to the Remote software module 60. If "ACON Convergence" is selected from the menu then the ACON CONVERGENCE menu 52 is displayed (FIG. 5) which allows a choice between full-screen convergence, touch up mode and static convergence (centre only). The program then waits for an item selection from this menu. If centering is chosen, the green-target motor coordinates for the center convergence point are copied from an internal BRAM database into an edit buffer in RAM comprising the X and Y motor coordinates for the green targets of all 45 convergence control points 46. This edit buffer is copied to and from the BRAM database by the ACON kernel 62. Next, the A_CENTER routine 64 is called. If either full-screen convergence or touchup mode is chosen then A_CENTER is similarly called. However when control is returned, provided the operations performed during A_CENTER did not generate a fatal error, all of the convergence point motor coordinates are recalled from BRAM and the A_CONV module 66 is called (with a flag set for Touch up mode if it was selected).

If a fatal error is generated at any point in either A_CENTER or A_CONV module executions then the corresponding process terminates and returns to the Kernel 62 with an appropriate error code. The corresponding error message is displayed on-screen until the user presses "EXIT" at which time control is passed back to the Remote software 60. If the user does not press "EXIT" within 30 seconds then the message is removed and the error is saved in the BRAM database. The next time the user enters the ACON CONVERGENCE menu 52, the error message will be shown below the menu entries as "Previous Error:<error message>".

To allow the user to abort an autoconvergence while it is in progress, a small timer-interrupt routine is implemented for the purpose of checking every quarter of a second for the detection of an "EXIT" or "POWER" keypress. If an "EXIT" keypress is detected four consecutive times (i.e. for one full second), control is passed back to the Remote software package 60. Similarly, if a "POWER" keypress is detected four times in a row then the projector is powered down, as discussed above.

Figure 6:
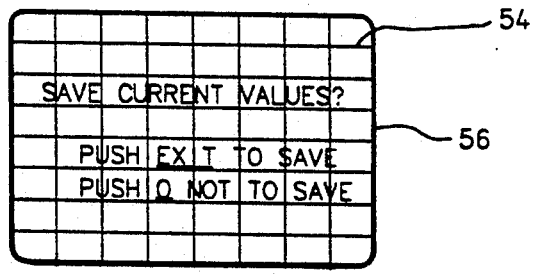
FIG. 6 is a save menu displayed in accordance with the preferred embodiment.

After an autoconvergence is successfully completed the SAVE menu 56 is displayed superimposed on top of RGB crosshatch pattern 54 allowing the user to optionally save the new convergence to BRAM (FIG. 6). Due to the possibility of bus noise coupling into the display screen the Remote Control Board's external bus is disabled while the menu 56 is displayed. If the user selects the "save" option, the Kernel 62 saves the updated green-target motor coordinates to the BRAM database and requests the Convergence software module 70 to save the convergence point data. If not, the screen is reconverged with the old data. Finally, control is passed back to the Remote software package 60.

The autocentering module 64 functions to register the red and blue rasters onto the green-target image at their respective centers.

The routine first establishes the origin of the motor coordinate system in the lower left hand corner of the screen (as viewed from the projector) by driving both motors 7A and 7B into a set of mechanical end-stops. This is done by initializing the motor coordinates to the largest values physically possible with the hardware and moving the motors at full speed to a destination position of (0,0). Since the motors may bounce from the endstops at a short distance, the initialization is repeated at a much slower speed and moving a much smaller distance to bring the motors snugly up against the endstops.

The screen contrast is set to a value of 70% of full. This sets the intensity of the targets produced by the projector's internal video generator to maximum (anti-blooming circuitry in the video generator prevents any increase in intensity above a setting of about 70%).

Next, the motor coordinates of the center convergence control points 46 (FIG. 4) determined from the last autocentering operation, are retrieved from memory. If autocentering is being performed for the first time since a hard reset of the projector, the retrieved motor coordinate values are specified at a default value of FFFFH (hex), which is a physically impossible value indicating the reset. In this case the routine must locate the center of the screen with no previous knowledge of its position. To this end, the screen is blanked and a green horizontal bar running through the centre is displayed. The X motor 7A is moved to the center of its horizontal range and then moved incrementally "upwards" (away for the vertical endstop) until the sensor can "detect" the bar (i.e. when the signal from the sensor exceeds a visibility threshold). If autocentering is not being performed for the first time since a system reset then the motors 7A and 7B are simply moved to the retrieved coordinates.

Next, a green target is displayed at the center of an otherwise blank screen. The SEARCH subroutine 68 is called to find the target by moving the motors 7A and 7B, if necessary, in a spiral path within an area of defined size surrounding the present position, as discussed in greater detail below with reference to FIG. 10. If the target cannot be found, the SEARCH module 68 returns an errorcode to the A_CENTER module 64 which then terminates with an errorcode signal being displayed in the form of: "green center not visible". If the green target has been located, the SEARCH module 68 attempts to center the target image on the sensor 1. The result may be in error due to the possibility of a high sensor signal clipping during analog-to-digital conversion. If clipping is detected, the contrast level is reduced such that the signal does not exceed 80% of A/D convertor full scale. The new contrast level is saved and SEARCH is called again to center the target image and calculate more precisely the resulting centroid position on the sensor.

The center target is next displayed in red. The CONVERGE routine 70 is called to move the red target via centering voltages on the correction coils, so that the target is centered onto the sensor 1 (i.e. the red centroid is the same as that calculated for the green target). If for some reason this cannot be done, then the CONVERGE routine 70 will generate and transmit an errorcode to the A_CENTER module 64 which then returns to the calling program. Otherwise, the center target is displayed in blue. If the green signal was at least 50% of full scale then the screen contrast is reduced to 80% of the green contrast (to prevent the blue signal from clipping) and the coordinates are saved. The CONVERGE routine 70 is called again, this time to converge the blue onto the green. If this is successful, the A_CENTER module 64 saves a "no error" errorcode and returns control to the calling program.

The full screen autoconvergence module 66 functions to register the red and blue colours on to the green target image at all screen convergence control points 46. (FIG. 4).

This routine converges the red and blue colours to the green target at all 45 convergence control points 46 (FIG. 4) sequentially in a predetermined order to achieve full screen convergence. Both the red and blue images are converged fully at each control point before moving on to the next.

There are two possible orders of control point selection for convergence. One, used for "Full screen" mode, converges some of the control points more than once to compensate for a left-to-right convergence interaction inherent in the projector electronics (most apparent at scan frequencies above 35 KHz). The second sequence, used for "Touch-up" mode, converges each point only once and is used at low scan frequencies or when convergence errors are small. Neither sequence starts with the center point since it is assumed to have been converged initially by means of the A_CENTER module 64.

The A_CONV routine 66 starts by checking the state of the "Touch-up" flag and choosing one of the above-noted sequences accordingly. For each control point within the sequence the following algorithm is performed: the DISPLAY module 72 is called to draw a green reference target as close as possible to the control point position on an otherwise blank screen (the target row and column coordinates are accessed from an internal memory table). The contrast of the screen is then adjusted, by multiplying the green nominal contrast obtained at the center of the screen by a factor accessed from an internally stored "contrast table". This increases the contrast in the corners of the screen to attempt to compensate for projection lens vignetting. The SEARCH module 68 is then called to find the target by aiming the photosensor 1 with the motors 7A and 7B. If the target is located, SEARCH centers the target on the sensor 1 and calculates the target centroid position, as discussed below with reference to the POS_CALC module 78.

If the target is not located, then it is possible that the target could be off-screen. An off-screen control point that has an on-screen nearest neighbor must be converged to some degree even though it is not visible because the offscreen target will affect that portion of the image between itself and the on-screen control point. The off-screen target will even affect the on-screen control point itself if the above mentioned left-to-right interaction is large. According to one embodiment of the invention, an off-screen control point may be "converged" by copying to it the convergence parameters of an on-screen nearest neighboring control point. During "Full-screen" mode the existence of an off-screen target is further complicated by the left-to-right interaction effect discussed above. For instance, if the target for a control point on the extreme left edge of the raster is off-screen, the program skips it and attempts to converge the next point to the right. The parameters obtained are copied to the off-screen point and the right point is then converged again.

Assuming the green target at the current control point has been located, the screen colour is then switched to red. The screen contrast is set to the red nominal value times a factor from the contrast table. The CONVERGE module 70 is called to move the target by way of the Digital Convergence Board as close to the green target centroid position as possible.

The screen colour is then switched to blue, screen contrast is set to the blue nominal value times a table factor and the CONVERGE module 70 is called to register the blue to the green similarly. The target is then erased to prepare a blank screen for the next point.

The search module 68 functions to locate the green reference target image at a given convergence control point 46 and center its image on the photosensor 1.

In operating the search module 68, it is assumed that the calling program has specified a convergence control point 46 from one of the 45 possible points. The last known coordinates of the green reference target image associated with this point are retrieved from internal memory (i.e. BRAM). The motors 7A and 7B are moved to the indicated position and the photosensor 1 is accessed. If the target is not immediately visible to the photosensor 1, the motors 7A and 7B move the sensor in a "spiral" search path in the field of view of sensor 1 until the image can be seen, as shown with reference to FIG. 10.

In the event the target cannot be found, an error code indicating this result is returned to the calling program.

In the event the target is found, the motors 7A and 7B are microstepped such that the target is moved to the center of the sensor 1 (within a defined window of accuracy) and an accurate calculation of the final centroid position is made. Finally, a "no error" error code is saved and the search module 68 returns to the calling program.

The converge module 70 functions to register either the red image or the blue image on top of the green image at a selected convergence control point 46.

It is assumed that the calling program has displayed a red or blue colour target at the specified convergence control point and that the sensor is pointing directly at the control point's currently invisible green target. The CONVERGE module 70 moves either the red image or the blue image at the control point 46 until the centroid of the target displayed is imaged on the photosensor 1 at the same position as the green target centroid.

Figure 10:
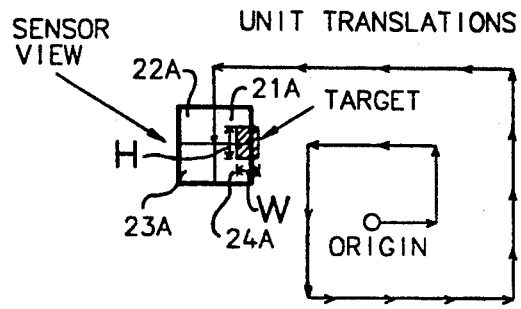
FIG. 10 illustrates a spiral search path of the photodiode array in accordance with an aspect of the present invention.

The routine first checks to ensure that the sensor has detected the target. If the sensor has not detected the target, the target is moved outwardly from its current position in a spiral path in an attempt to intersect the sensor viewing field (FIG. 10). The movement is accomplished using the Digital Convergence Board under the control of the Convergence software package 74. For each off-center convergence point, and for each colour, a pair of 8-bit values specify the horizontal and vertical displacement from "nominal" (center values are also specified as 8-bits but the total centering range is 12-bits). The CONVERGE module 70 controls the position of a colour at a convergence point by calling the Convergence software package 74 and passing to it the indices of the point, the colour and the desired horizontal and vertical movements.

The target is moved incrementally in the spiral path by a distance on the screen equal to half of the sensor's field of view. This is done until either the target is visible or until the end of the defined spiral search path is reached. (Visibility is determined by the consistent return of a signal from one of the photodiodes 21A-24A (FIG. 2) above a "visibility threshold" level). If the target cannot be found then the CONVERGE module 70 returns control to the calling program with an errorcode. If a movement is specified during the spiral search (FIG. 10) that exceeds the hardware range, the convergence software 74 moves the convergence point as far as possible and returns a non-zero errorcode, which is ignored by the spiral search algorithm.

If the target is found then its centroid coordinates are calculated. The differences in the coordinates between calculated centroid and the previously imaged green target centroid are used to calculate the amount of horizontal and vertical convergence correction required to zero the difference. The Convergence software package 74 is then called to perform the movement. Again, if the required movement is beyond the hardware range, the convergence software 74 moves the convergence point as far as possible and returns a nonzero errorcode. In this case as well, the CONVERGE module 70 returns to the calling program with an errorcode.

Otherwise, the target is moved the specified distance, and a new centroid position is calculated. The process continues in a loop until either the differences between the actual and desired horizontal and vertical coordinates are less than the minimum required for accurate convergence or a maximum number of attempts is exceeded. As the centroid gets closer to the reference position the number of averaged samples per sensor reading is increased in order to increase the accuracy of the result. The last few readings are done with the maximum frames required for full accuracy, a number calculated previously in A_CENTER.

The display module 72 functions to display characters in red, green or blue at any one of the 32 by 32 possible character positions of the projector system.

This routine utilizes the video control board to display a character on the screen. The board can display any of 128 characters (ASCII text and special graphics) on screen with in a 32 by 32 matrix. The calling program specifies the horizontal (i.e. column) and vertical (i.e. row) coordinates of the desired character position on the screen. It also specifies a colour code designating either red, green or blue. The display module 72 first selects a character mode and then enables the internal video display (via the video control board). Next, the projector gun controls are switched (via the projector waveform board) to display the specified colour. The code for the selected character (from any one of the 128 defined codes in the video control board character ROM) is then written to the video control board RAM at the address calculated to display the character at the specified position.

The CONVERGENCE S/W module 74 accepts as control data the direction of movement (horizontal or vertical), the colour to move, and the desired amount of movement and in response controls the digital convergence board to effect the movement of the chosen colour.

The ACQUIRE module 76 functions to "read" the photosensor 1 and obtain a value from each quadrant proportional to the amount of light that has fallen on the quadrant during a video frame from an on-screen video target.

It is assumed that when this routine is called a video target has already been projected on the screen and the sensor 1 is pointing at it. The target, composed of a series of short scanline segments, is displayed for approximately 1/32 of the field time. The peak hold circuit 32 on the ACON Control circuit 28 is designed to integrate the photosignals over the extent of each quadrant and to hold the peaks of each result to yield signals proportional to the light incident on each quadrant. These signals are then converted to digital via ADC 36 and are read by the microprocessor via interface 38 (FIG. 3).

To commence a sensor reading, the four peak-hold circuits 32 are intitialized (discharged) during a vertical retrace period of the projection display. During the next video field, the light from the target will result in signals being generated from each quadrant. The peaks of these signals are held for the remainder of the field. During the next vertical retrace period each of the four peak-hold circuits 32 are read in succession. This is done for each circuit by selecting the appropriate channel of MUX 34, which initiates the analog-to-digital conversion via ADC 36. Once the ADC 36 completes its conversion, the 12-bit result is read from the ADC output register. The peak-hold circuits 32 must be discharged immediately after all four readings have been taken to allow the sensor 1 to be read again during the following video field.

The calling routine must specify the number of video fields over which the readings should be averaged. For the specified number of fields (assumed to be a power of two) sensor readings are taken and a running sum is maintained for each quadrant. Finally, the sums are divided by the number of fields to obtain averaged readings that are passed to the calling program upon return.

Due to the possibility of digital noise coupling into the picture and thereby affecting the sensor readings, it is necessary to ensure that the microprocessor external bus connected to the interface circuit 38 be disabled during the video integration time.

The centroid position calculation module 78 functions to calculate the position of the centroid of a target imaged on the photosensor 1.

It is assumed that sensor readings denoted as Q1, Q2, Q3 and Q4 have been obtained, representing the light output of a target imaged on quadrants 21A to 24A, respectively. Furthermore, it is assumed that readings B1, B2, B3 and B4 have been taken of the background (no signal) light level on these quadrants via light-rejecting photodiodes 21B to 24B, respectively First, the background signals are subtracted from the target signals (i.e. V1=Q1−B1, V2=Q2−B2, V3=Q3−B3, V4=Q4−B4).

Figure 9:
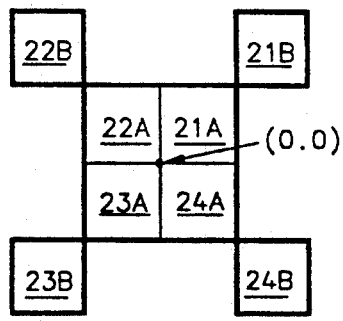
FIG. 9 illustrates the quadrant sensor coordinate system in accordance with the preferred embodiment.

If the results are zero or negative, then they are set to zero +one least-significant bit. However, if all of the numbers are zero or negative then the routine exits without calculating a centroid (i.e. it doesn't make sense to calculate the centroid of the background signal). If all of the numbers are positive, however, the position of the centroid of the target image on the sensor is then calculated according to the following equations:

$$DX = \frac{W}{4} \cdot \frac{V3 - V1}{V3 + V1} + \frac{W}{4} \cdot \frac{V2 - V4}{V2 + V4}$$

and $$DY = \frac{H}{4} \cdot \frac{V3 - V1}{V3 + V1} - \frac{H}{4} \cdot \frac{V2 - V4}{V2 + V4}$$

where DX and DY are the displacements of the centroid along the x axis (horizontal) and y axis (vertical) with respect to a local coordinate system (x,y) aligned with the sensor edges and with the origin (0,0) in the center (FIG. 9). W is the width of the target image and H is its height. The arithmetic is done to 16-bit precision (sensor readings Q1, Q2, Q3, and Q4 are 12-bit values).

The motor control module 80 functions to aim the sensor 1 at a specified position on the projection screen.

This routine controls the positions of the X and Y stepper motors 7A and 7B in the locator assembly 26. The module 80 receives (X,Y) coordinates for a destination position from the calling program and subtracts from them the (X,Y) coordinates for the current position of the motors to determine the direction and "distance" (in microsteps) to move the respective motors. The X axis motor 7A is moved first, and then the Y axis motor 7B.

For any movement on either of the motors larger than a few microsteps, the motors 7A and 7B are accelerated toward a given speed and then decelerated to arrive at the destination position. This is done to avoid loosing steps and/or overshooting the destination position, since, in the preferred embodiment no additional mechanical damping is provided on the motors.

The maximum speed and acceleration/deceleration rates may be different for each motor 7A and 7B as a result of any differences in load mass and rotational inertia between the motors.

As an alternative, mechanical damping may be provided or software (i.e. electronic) damping may be effected depending on specific implementations.

In summary, according to the present invention, a completely automatic convergence system is provided utilizing inexpensive and highly accurate stepper motors for positioning a photosensor array to detect mis-registration of component colour images. The system is highly accurate and has particular industrial applicability to rear view and off-axis high-gain display systems.

Various modifications and alternative embodiments are possible within the sphere and scope of the invention as defined by the claims appended hereto.

We claim:

1. For use in a projection video display, an automatic convergence system for correcting mis-registration of component colour images projected onto a viewing surface, comprising:
   a) means for projecting a first component colour target image at a predetermined convergence point on said viewing surface;
   b) means remote from said viewing surface for determining a position of said first component colour target image on said surface relative to a predetermined reference frame;
   c) means for projecting further component colour images near said predetermined convergence point, said means for projecting further component colour images projecting images that are movably independent from said first component colour target image;
   d) means remote from said surface for determining respective positions of said further component colour images relative to said predetermined reference frame; and
   e) means for registering each component colour image of said further component color images with said first component colour target image on said viewing surface, said means for registering including means for calculating differences between the position of said first component colour target image and the respective positions of each component colour image of said further component colour images and deflection means for independently moving respective positions of each component colour image of said further component colour images with respect to said first component colour target image by respective amounts proportional to said differences until said differences are substantially eliminated such that said first component colour target image and said further component colour images are in substantial registration.

2. The system of claim 1 wherein both said means for determining are comprised of an assembly including:
   f) a rigid base;
   g) a photosensor for optically detecting said first component colour target image and said further component colour images and for generating respective analog voltage signals in response;
   h) a first stepper motor mounted to said rigid base for moving said photosensor about a first axis; and
   i) a second stepper motor supporting said photosensor and mounted to said first stepper motor for moving said photosensor about a second axis orthogonal to said first axis, whereby said photosensor may be aimed at a predetermined area of a plurality of areas of said surface responsive to movements of said first and second stepper motors.

3. The system of claim 2 wherein:
   said first component colour target image is one target image of a plurality of target images successively generated at respective predetermined convergence points, each target image corresponding to a respective area of said plurality of areas;
   said further component colour images constitute a colour image set of a plurality of colour image sets, each colour image set corresponding to a respective target image of said plurality of target images; and
   said photosensor further comprises a tubular housing supported by said second stepper motor, a photodiode array disposed at one end of said tubular housing, and an objective lens disposed at an opposite end of said tubular housing for focusing each said target image and each said further component colour image of each said colour image set on said photodiode array.

4. The system of claim 3 wherein said means for registering further includes means for successively aiming said photosensor and operating said means for calculating and said deflection means to register each component colour image of said further component colour images with a respective first component colour target image at each area of said plurality of areas.

5. The system of claim 2 wherein said means for calculating further comprises a control circuit for receiving said respective analog voltage signals as four analog voltage signals V1, V2, V3 and V4, and means for calculating horizontal and vertical displacements denoted as DX and DY, respectively, of a centroid from said predetermined reference frame, as follows:

$$DX = \frac{W}{4} \cdot \frac{V3 - V1}{V3 + V1} + \frac{W}{4} \cdot \frac{V2 - V4}{V2 + V4}$$

and $$DY = \frac{H}{4} \cdot \frac{V3 - V1}{V3 + V1} + \frac{H}{4} \cdot \frac{V2 - V4}{V2 + V4}$$

where W and H represent a width and a height, respectively, of said first component colour target image.

6. The system of claim 5 wherein said control circuit further comprises means for receiving said four analog voltage signals and in response holding peak values thereof, means for receiving and converting said peak values into corresponding digital values, and a microprocessor for receiving said digital values and in response calculating said horizontal and vertical displacements.

7. The system of claim 6 wherein said control circuit further comprises first and second motor control circuits connected to said microprocessor and respective ones of said first and second stepper motors for selectively aiming said photosensor at each said predetermined area in accordance with said horizontal and vertical displacements and under control of said microprocessor.

8. The system of claim 7 wherein each said first and second motor control circuits comprises a microstep controller for specifying current levels to be applied to each winding 149 pair of windings in each said first and second stepper motors, and a motor driver for supplying said specified current to said windings at a predetermined voltage.

9. The system of claim 6 wherein said means for projecting said first component colour target image and said means for projecting said further component colour images are comprised of a projector system connected to said microprocessor for receiving said horizontal and vertical displacements and in response displaying predetermined ones of said first component colour target image and said further component colour images.

10. For use in a projection video display, a method for correcting mis-registration of component colour images, with respect to a first component colour target image, projected onto a viewing surface, the method comprising the steps of:
   a) projecting the first component colour target image at a predetermined convergence point on said viewing surface;
   b) determining by means remote from said viewing surface a position of said first component colour target image on said surface relative to a predetermined reference frame;
   c) projecting further component colour images near said predetermined convergence point, said step of projecting further component colour images projecting images that are movably independent from the first component colour target image;
   d) determining by means remote from said surface respective positions of said further component colour images relative to said predetermined reference frame; and
   e) registering each component colour image of said further component colour images with said first component colour target image on said viewing surface by calculating differences between the position of said first component colour target image and the positions of each component colour image of said further component colour images and independently moving respective positions of each component colour image of said further component colour images with respect to said first component colour target image by respective amounts proportional to said differences until said differences are substantially eliminated, such that said first component colour target image and said further component colour images are in substantial registration.

11. The method of claim 10 wherein each said step of determining further comprises detecting a centroid of said first component colour target image and a centroid of each colour image of said further component colour images, generating a plurality of respective analog signals, denoted as V1, V2, V3 and V4, receiving said plurality of analog voltage signals, and calculating horizontal and vertical displacements denoted as DX and DY, respectively, of said centroids from said predetermined reference frame, as follows:

$$DX = \frac{W}{4} \cdot \frac{V3 - V1}{V3 + V1} + \frac{W}{4} \cdot \frac{V2 - V4}{V2 + V4}$$

and $$DY = \frac{H}{4} \cdot \frac{V3 - V1}{V3 + V1} + \frac{H}{4} \cdot \frac{V2 - V4}{V2 + V4}$$

where W and H represent a width and a height, respectively, of said first component colour target image.

12. For use in a video display, an automatic convergence system for correcting mis-registration of component colour images projected onto a surface, comprising:
   a) means for generating a first component colour target image at a predetermined convergence point on said surface;
   b) means for locating the position of said target image on said surface relative to a predetermined reference frame;
   c) means for generating further component colour images at said convergence point;
   d) means for locating respective positions of said further component colour images relative to said reference frame, and;
   e) means for successively calculating the differences between the positions of said first component colour target image and said respective positions of said further images and in response moving said further component colour images respective amounts proportional to said differences until said differences are substantially eliminated, such that said target image and said further images are in substantial registration;
   wherein both said means for locating are comprised of an assembly including:
   f) a rigid base;
   g) a photosensor for optically detecting said target image and said further images and in response generating respective analog voltage signals;
   h) a first stepper motor mounted to said base for movement about a first axis;
   i) a second stepper motor supporting said photosensor and mounted to said first stepper motor for movement about a second axis orthogonal to said first axis;
   whereby said photosensor may be aimed at predetermined areas of said surface responsive to movement of said first and second stepper motors;
   wherein said photosensor comprises a tubular housing supported by said second stepper motor, a photodiode array disposed at one end of said housing, and an objective lens disposed at an opposite end of said housing for focusing each said target image and said further images on said photodiode array; and
   wherein said photodiode array comprises four inner quadrant elements for detecting the centroid of said target image and said further images and in response generating four respective ones of said analog signals, denoted as V1, V2, V3 and V4; and four corner elements connected anode-to-cathode relative to respective ones of said inner quadrant elements for cancelling the effects of ambient light on said inner quadrant elements.

13. For use in a video display, an automatic convergence system for correcting mis-registration of component colour images projected onto a surface, comprising:
   a) means for generating a first component colour target image at a predetermined convergence point on said surface;
   b) means for locating the position of said target image on said surface relative to a predetermined reference frame;
   c) means for generating further component colour images at said convergence point;
   d) means for locating respective positions of said further images relative to said reference frame, and;
   e) means for successively calculating the differences between the positions of said first component colour target image and said respective positions of said further images and in response moving said further component colour images respective amounts proportional to said differences until said differences are substantially eliminated, such that said target image and said further images are in substantial registration;
   wherein both said means for locating are comprised of an assembly including:
   f) a rigid base;
   g) a photosensor for optically detecting said target image and said further images and in response generating respective analog voltage signals;
   h) a first stepper motor mounted to said base for movement about a first axis;
   i) a second stepper motor supporting said photosensor and mounted to said first stepper motor for movement about a second axis orthogonal to said first axis;
   whereby said photosensor may be aimed at predetermined areas of said surface responsive to movement of said first and second stepper motors;
   wherein said means for successively calculating further comprises a control circuit for receiving four analog voltage signals $V_1$, $V_2$, $V_3$ and $V_4$, and in response calculating horizontal and vertical displacements denoted as DX and DY, respectively, of said centroid from said predetermined reference frame, as follows:

$$DX = \frac{W}{4} \cdot \frac{V3 - V1}{V3 + V1} + \frac{W}{4} \cdot \frac{V2 - V4}{V2 + V4}$$

$$DY = \frac{H}{4} \cdot \frac{V3 - V1}{V3 + V1} - \frac{H}{4} \cdot \frac{V2 - V4}{V2 + V4}$$

where W and H represent the width and height, respectively, of said target image; and
   wherein said control circuit further comprises means for controlling said first and second stepper motor to move about said first and second axes in a predetermined sequence such that said photosensor follows a spiral path of movement for locating respective ones of said target image and said further images.

* * * * *